United States Patent
Donofrio

(10) Patent No.: US 9,870,227 B2
(45) Date of Patent: Jan. 16, 2018

(54) PERFORMING STENCIL COMPUTATIONS

(71) Applicant: THE REGENTS OF THE UNIVERSITY OF CALIFORNIA, Oakland, CA (US)

(72) Inventor: David Donofrio, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 337 days.

(21) Appl. No.: 14/352,870

(22) PCT Filed: Nov. 8, 2012

(86) PCT No.: PCT/US2012/064167
§ 371 (c)(1),
(2) Date: Apr. 18, 2014

(87) PCT Pub. No.: WO2013/070925
PCT Pub. Date: May 16, 2013

(65) Prior Publication Data
US 2014/0244982 A1 Aug. 28, 2014

Related U.S. Application Data

(60) Provisional application No. 61/558,975, filed on Nov. 11, 2011.

(51) Int. Cl.
| | | |
|---|---|---|
| G06F 15/00 | (2006.01) | |
| G06F 7/38 | (2006.01) | |
| G06F 9/00 | (2006.01) | |
| G06F 9/44 | (2006.01) | |
| G06F 9/345 | (2006.01) | |
| G06F 9/30 | (2006.01) | |

(Continued)

(52) U.S. Cl.
CPC ........ *G06F 9/3455* (2013.01); *G06F 9/30007* (2013.01); *G06F 9/3877* (2013.01); *G06F 17/10* (2013.01)

(58) Field of Classification Search
None
See application file for complete search history.

(56) References Cited

U.S. PATENT DOCUMENTS

| | | | |
|---|---|---|---|
| 7,859,541 B2 | 12/2010 | Montrym et al. | |
| 2007/0050596 A1* | 3/2007 | Cooke | G06F 9/345 711/216 |
| 2012/0159124 A1* | 6/2012 | Hu | G06F 12/0842 712/205 |

OTHER PUBLICATIONS

PCT International Preliminary Report on Patentability and Written Opinion of the International Searching Authority dated May 22, 2014, for International Application No. PCT/US2012/064167 filed Nov. 8, 2012, 7 pages.

(Continued)

*Primary Examiner* — George Giroux
(74) *Attorney, Agent, or Firm* — Womble Bond Dickinson (US) LLP

(57) ABSTRACT

A method and apparatus for performing stencil computations efficiently are disclosed. In one embodiment, a processor receives an offset, and in response, retrieves a value from a memory via a single instruction, where the retrieving comprises: identifying, based on the offset, one of a plurality of registers of the processor; loading an address stored in the identified register; and retrieving from the memory the value at the address.

20 Claims, 5 Drawing Sheets

(51) Int. Cl.
　　　*G06F 17/10*　　　(2006.01)
　　　*G06F 9/38*　　　(2006.01)

(56) References Cited

OTHER PUBLICATIONS

Kamil, S. et al. (2009). "A Generalized Framework for Auto-tuning Stencil Computations", Proceedings of CUG: Cray User Group Conference, Atlanta, GA, 11 pages.
Datta, K. et al. (2009). "Optimization and Performance Modeling of Stencil Computations on Modern Microprocessors", SIAM Review, 31 pages.
International Searching Report and Written Opinion for PCT Patent Application No. PCT/US2012/064167, filed Nov. 8, 2012.
Dursun, H. et al. (2009). "In-core Optimization of High-order Stencil Computations," In PDPTA, Las Vegas, NV; 533-538.
Brickner, R.G. et al. (2009). "A Stencil Complier for the Connection Machine Models CM-2/200," In Fourth Workshop on Compiler for Parallel Computers, 10 pages.

* cited by examiner

PERFORMING STENCIL COMPUTATIONS

RELATED APPLICATIONS

This application claims priority to U.S. Provisional Patent App. No. 61/558,975 filed Nov. 11, 2011, which is hereby incorporated by reference in its entirety.

STATEMENT OF GOVERNMENT SUPPORT

This invention was made with government support under Contract No. DE-AC02-05CH11231 awarded by the U.S. Department of Energy. The government has certain rights in this invention.

FIELD

Embodiments of the present invention relate to data processing, and particularly relates to a method and apparatus for performing stencil computations via a single computer processor instruction.

BACKGROUND

Stencil computations are typically performed on a two- or three-dimensional grid of data. In a stencil computation, the value of a cell of the grid is updated based on the values of other nearby cells. Typically, stencil computations are performed by iterating through a grid in one dimension (say, the x-dimension) and updating the value of each visited cell based on nearby cells. For a two-dimensional grid, typically each cell C is updated based on a cell "above" cell C (i.e., a cell that is k positions away from cell C in the positive y-direction, where k is a positive integer) and a cell "below" cell C (i.e., a cell that is k positions away from cell C in the negative y-direction). Typically the two neighbors in the y-direction are the same distance from cell C, so that, for example, a cell C may be updated based on the cells immediately above and below cell C, or based on the cells that are two positions above and two positions below cell C, or based on the cells that are three positions above and three positions below cell C, etc.

As another example, in a three-dimensional grid with dimensions labeled x, y, and z, the value of a cell C may be updated based on:
- the value of the cell that is three positions away from cell C in the positive y-direction,
- the value of the cell that is three positions away from cell C in the negative y-direction,
- the value of the cell that is five positions away from cell C in the positive z-direction, and
- the value of the cell that is five positions away from cell C in the negative z-direction.

In the above three-dimensional example, the distance in the y-direction, known as the y stride, is three, and the distance in the z-direction, known as the z stride, is five.

Stencil computations arise in a variety of scientific and engineering applications, such as reverse time migration (RTM) calculations for seismic imaging in oil and gas exploration, numerical methods for partial differential equations, and digital image processing.

DETAILED DESCRIPTION

A method and apparatus for performing stencil computations efficiently are disclosed. In one embodiment, a multidimensional grid is stored in memory, and for a given cell C of the multidimensional grid, the memory addresses of nearby cells used in the stencil computation are pre-computed by a processor and stored in a set of registers of the processor. In one embodiment, each register of the set of registers is associated with a respective dimension and polarity (e.g., a first register may correspond to the y-dimension of the grid and positive polarity, a second register may correspond to the z-dimension of the grid and positive polarity, a third register may correspond to the y-dimension of the grid and negative polarity, etc.).

In one embodiment, each value that is stored at a pre-computed memory address (i.e., at a cell nearby cell C) is retrieved via a single processor instruction that combines several processor instructions into one operand. More particularly, as part of the single instruction, the processor: (i) receives an offset; (ii) identifies a particular register of the processor from the offset, where the identified register is associated with a particular dimension and polarity that characterizes the nearby cell; (iii) loads the pre-computed address that is stored in the identified register; and (iv) retrieves the contents stored at that address. The stencil computation for cell C is then performed using the nearby cell values (i.e., the values retrieved from the pre-computed memory addresses) and, optionally, the current value stored in cell C. Stencil computations for an entire multidimensional grid can be performed in a single instruction, multiple data (SIMD) fashion by performing the method for each cell, either in parallel or by iterating sequentially through the cells of the grid.

In one embodiment, a specialized processor is used to perform the method. In one such embodiment, the specialized processor comprises a coprocessor that is capable of performing tasks (ii) through (iv) above for a given offset (i.e., for a given nearby cell) in a single instruction, thereby greatly accelerating the stencil computations. In another embodiment, the method is performed by a computer system having a processor that is not specifically optimized for stencil computations (e.g., an Intel x86 microprocessor, an Advanced RISC Machines [ARM]-based processor, etc.).

Figure 1:
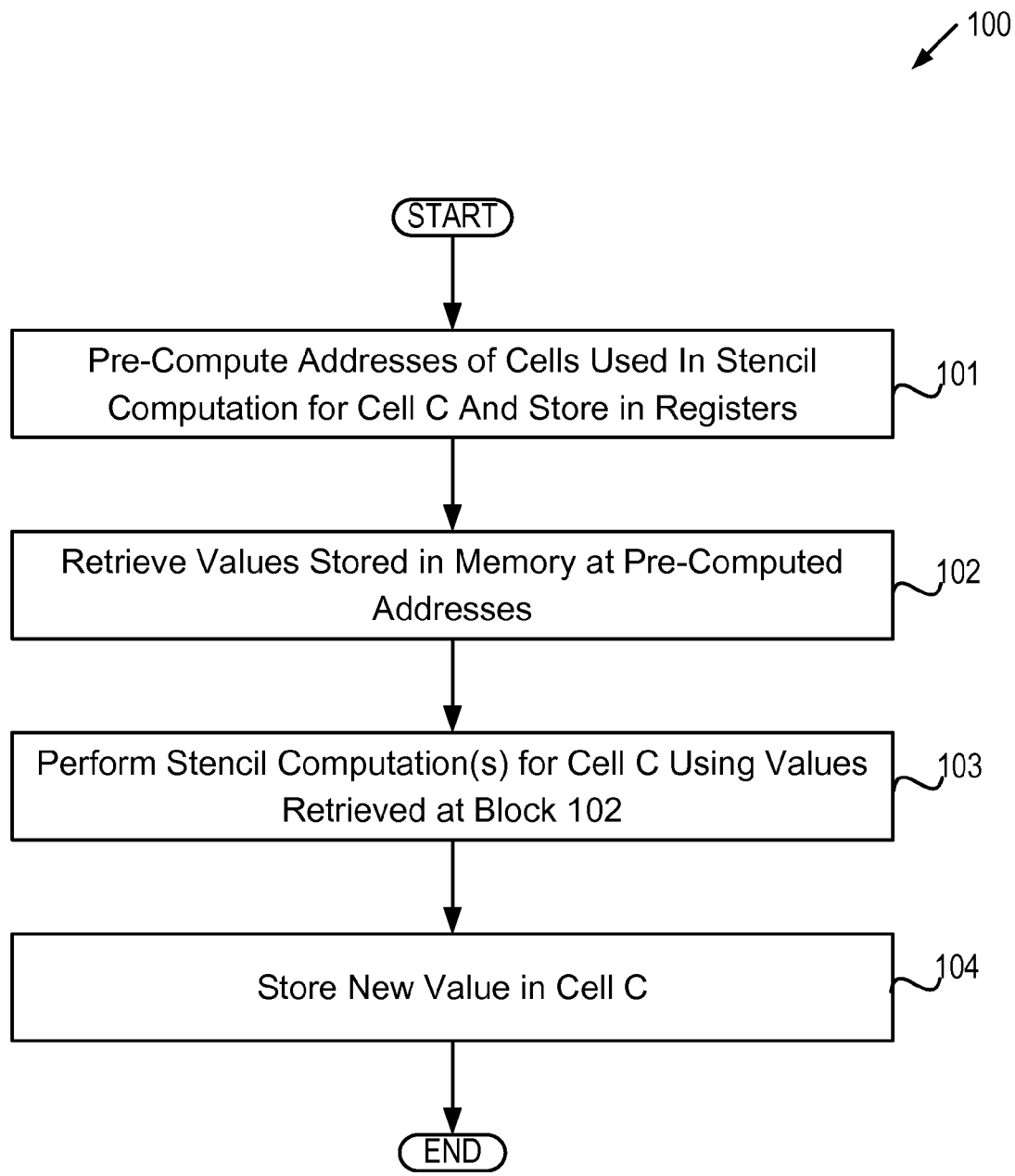
FIG. 1 depicts a flow diagram of an embodiment of a method for performing stencil computations.

FIG. 1 depicts a flow diagram of an embodiment of a method for performing a stencil computation, where the stencil computation is for a cell C belonging to a grid stored in a memory. The method is performed by processing logic that may comprise hardware (circuitry, dedicated logic, etc.), software (such as is run on a general purpose computer system or a dedicated machine), or a combination of both. In one embodiment, the method may be performed by the processor 520 described below with respect to FIG. 4, while in some other embodiments, the method may be performed by the computer system 500 described below with respect to FIG. 5, while in yet other embodiments, one or more blocks of FIG. 1 may be performed by some other machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 101, addresses of cells used in the stencil computation for cell C are pre-computed and stored in registers. An embodiment of a method for performing block 101 for a two-dimensional grid is described in detail below with respect to FIG. 2, and an embodiment of a method for performing block 101 for a three-dimensional grid is described in detail below with respect to FIG. 3.

At block 102, values stored in memory at the pre-computed addresses are retrieved. An embodiment of a method for performing block 102 is described in detail below with respect to FIG. 4.

At block 103, one or more stencil computations are performed for cell C using the values retrieved at block 102. More generally, a new value V is computed for cell C according to the equation:

$$V = f(\{\text{values retrieved at block } 102\}, \text{current value of cell } C)$$

where f is an arbitrary function. It should be noted that in some embodiments, f may be a function solely of the values retrieved at block 102, and may not be based on the value currently stored in cell C.

At block 104, new value V is stored in cell C. As will be appreciated by those skilled in the art, a stencil computation can be performed for an entire grid by iterating through the cells of the grid and invoking the method of FIG. 1 for each cell.

Figure 2:
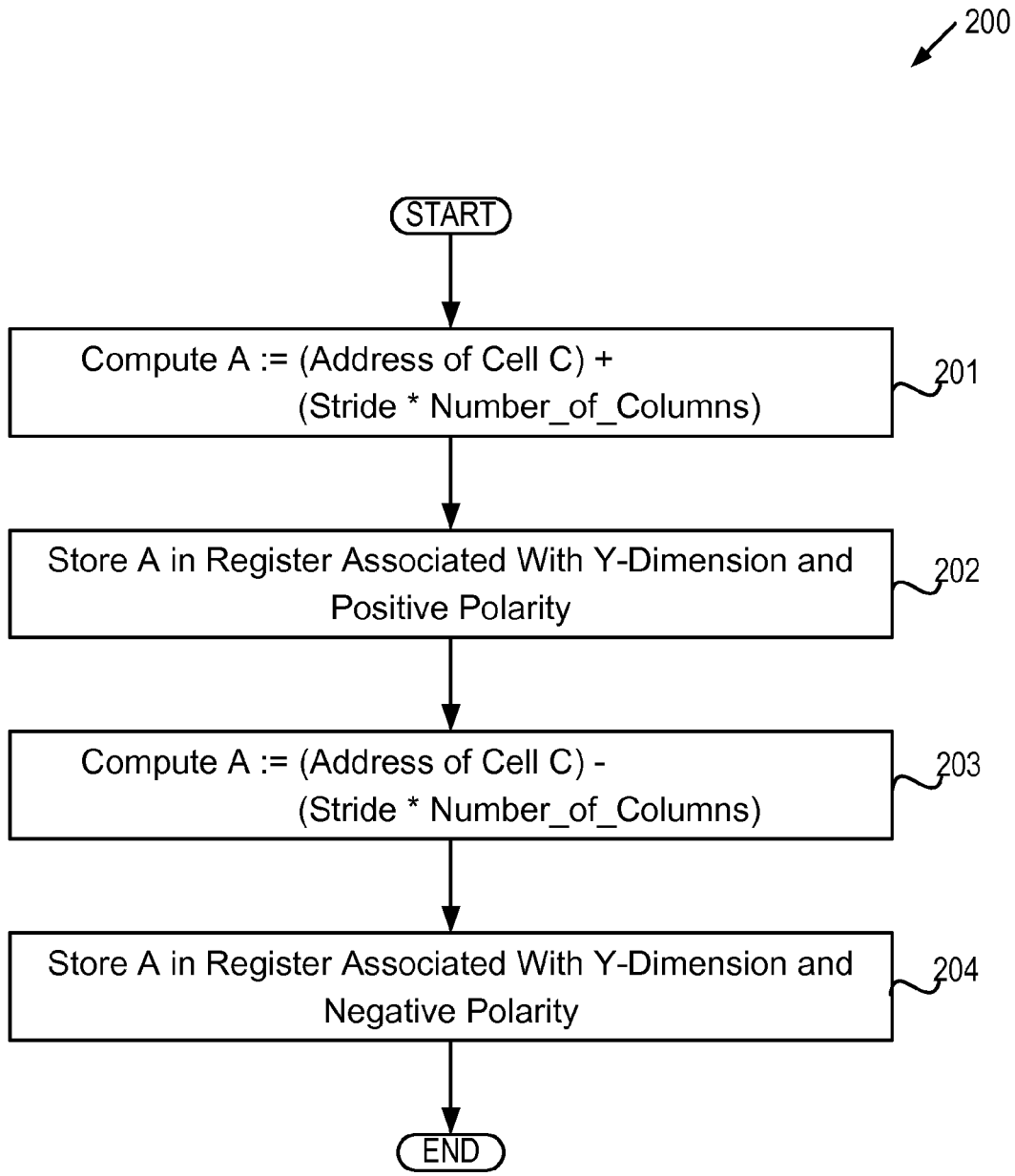
FIG. 2 depicts a flow diagram of an embodiment of a method for pre-computing addresses for a two-dimensional grid.

FIG. 2 depicts a flow diagram of an embodiment of a method for pre-computing addresses for a two-dimensional grid. The method is performed by processing logic that may comprise hardware (circuitry, dedicated logic, etc.), software (such as is run on a general purpose computer system or a dedicated machine), or a combination of both. In one embodiment, the method may be performed by the processor 520 described below with respect to FIG. 5, while in some other embodiments, one or more blocks of FIG. 2 may be performed by some other machine. It should be noted that in some embodiments, some blocks depicted in FIG. 2 may be performed simultaneously or in a different order than that depicted. It should also be noted that in the embodiment of FIG. 2, the grid is stored in memory in row-major order, so that the cells of the first row are stored at contiguous addresses of memory, followed by the cells of the second row, and so on.

At block 201, the value of variable A is computed as:

(Address of Cell C)+(Stride*Number_of_Columns)

where Stride is the single stride value (i.e., the stride value in the y-dimension) for the two-dimensional grid and Number_of_Columns is the number of columns in the two-dimensional grid.

At block 202, the value of A is stored in a register associated with the y-dimension and with positive polarity. As will be appreciated by those skilled in the art, the particular register that is associated with a given dimension/polarity is a design choice for the programmer implementing the method.

At block 203, the value of variable A is computed as:

(Address of Cell C)−(Stride*Number_of Columns)

and at block 204, the value of A is stored in a register associated with the y-dimension and with negative polarity. As is the case at block 201, the particular register that is associated with the Y-dimension and negative polarity is a design choice in the implementation of the method.

Figure 3:
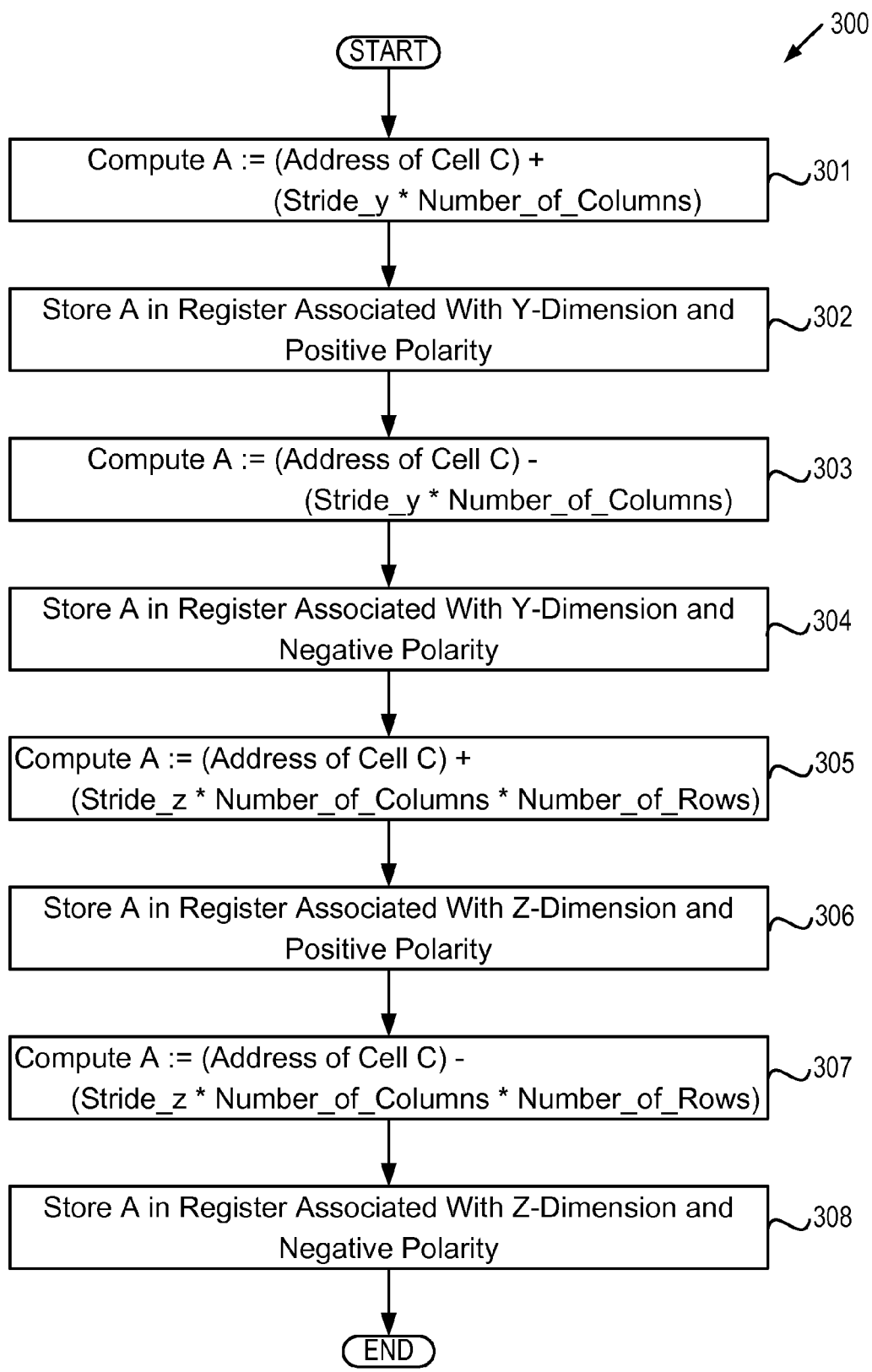
FIG. 3 depicts a flow diagram of an embodiment of a method for pre-computing addresses for a three-dimensional grid.

FIG. 3 depicts a flow diagram of an embodiment of a method for pre-computing addresses for a three-dimensional grid. The method is performed by processing logic that may comprise hardware (circuitry, dedicated logic, etc.), software (such as is run on a general purpose computer system or a dedicated machine), or a combination of both. In one embodiment, the method may be performed by the processor 520 described below with respect to FIG. 5, while in some other embodiments, the method may be performed by some other machine. It should be noted that in some embodiments, some blocks depicted in FIG. 3 may be performed simultaneously or in a different order than that depicted. It should also be noted that in the embodiment of FIG. 3, the grid is stored contiguously in memory as a series of two-dimensional grids in row-major order (i.e., the two-dimensional grid for z=1 in row-major order, the two-dimensional grid for z=2 in row-major order, and so forth).

At block 301, the value of variable A is computed as:

(Address of Cell C)+
  (Stride_y*Number_of_Columns)

where Stride_y is the stride value in the y-dimension for the three-dimensional grid and Number_of_Columns is the number of columns (i.e., the size of the y-dimension) in the grid.

At block 302, the value of A is stored in a register associated with the y-dimension and with positive polarity. As in the method of FIG. 2 for two-dimensional grids, the particular register that is associated with a given dimension/polarity is a design choice.

At block 303, the value of variable A is computed as:

(Address of Cell C)−(Stride_y*Number_of Columns)

and at block 304, the value of A is stored in a register associated with the y-dimension and with negative polarity.

At block 305, the value of variable A is computed as:

(Address of Cell C)+
  (Stride_z*Number_of_Columns*Number_of Rows)

where Stride_z is the stride value in the z-dimension and Number of Rows is the number of rows (i.e., the size of the x-dimension) in the grid.

At block 306, the value of A is stored in a register associated with the z-dimension and with positive polarity.

At block 307, the value of variable A is computed as:

(Address of Cell C)−
  (Stride_z*Number_of_Columns*Number_of_Rows)

and at block 308, the value of A is stored in a register associated with the z-dimension and with negative polarity.

As will be appreciated by those skilled in the art, the method of FIG. 3 can be easily modified to apply to the general case of an N-dimensional grid, where N may be greater than three.

Figure 4:
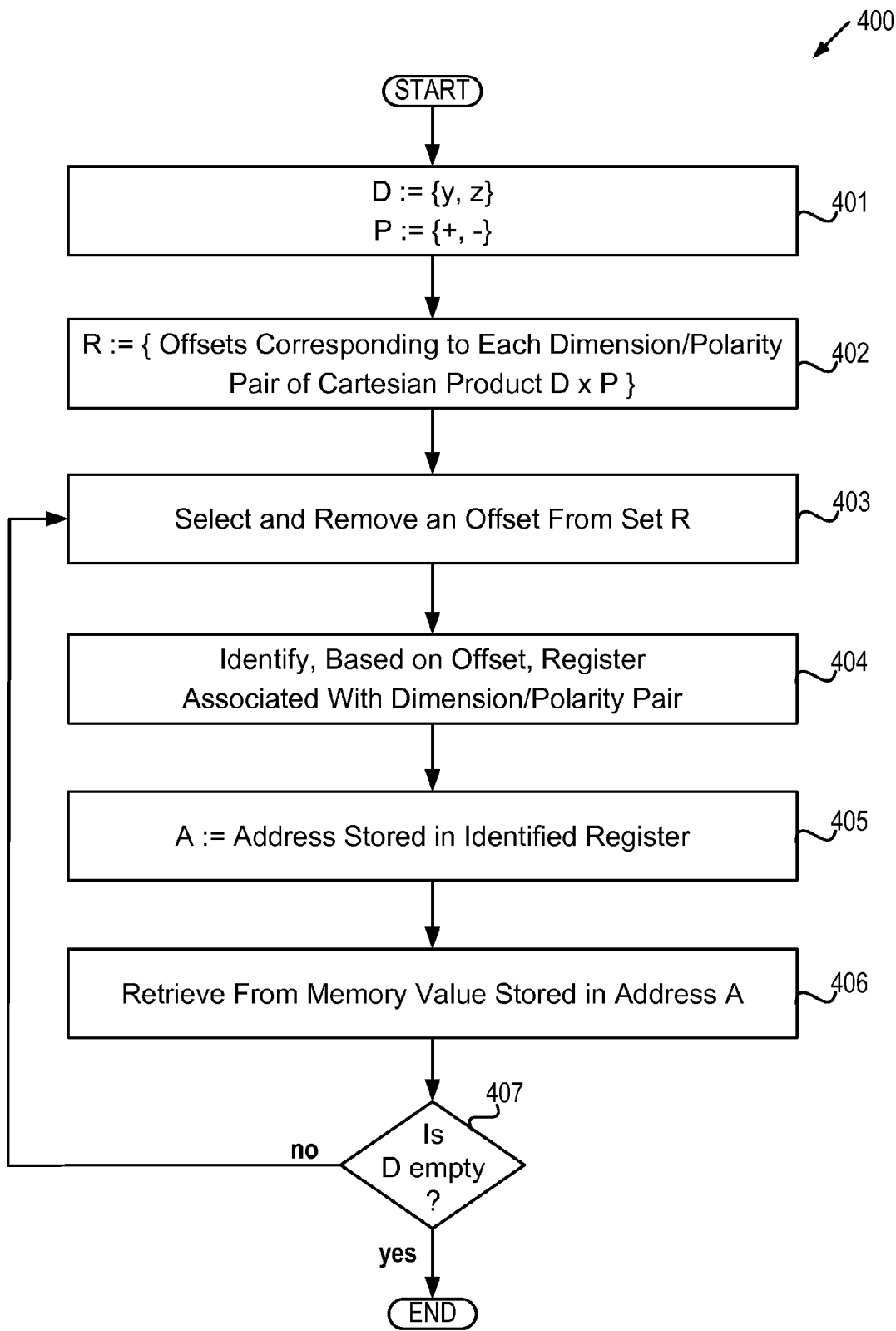
FIG. 4 depicts a flow diagram of an embodiment of a method for retrieving values at pre-computed addresses of a memory.

FIG. 4 depicts a flow diagram of an embodiment of a method 400 for retrieving values at pre-computed addresses of a memory. The method is performed by processing logic that may comprise hardware (circuitry, dedicated logic, etc.), software (such as is run on a general purpose computer system or a dedicated machine), or a combination of both. In one embodiment, the method may be performed by the processor 520 described below with respect to FIG. 5, while in some other embodiments, the method may be performed by some other machine.

It should be noted that in some embodiments, some blocks depicted in FIG. 4 may be performed simultaneously or in a different order than that depicted. It should further be noted that while the embodiment of FIG. 4 is for a three-dimensional grid, this embodiment can easily be modified to apply to two-dimensional grids or grids with four or more dimensions by changing the definition of set D in block 401 accordingly.

At block 401, a set D is initialized to the set {x, y} and a set P is initialized to the set {+, −}. At block 402, a set R is initialized to contain offsets for each dimension/polarity pair of D×P, the Cartesian product of sets D and P. In one embodiment, the offsets are indices of the registers storing the pre-computed addresses for each dimension/polarity pair.

At block 403, an offset for a dimension/polarity pair is selected and removed from set R. At block 404, a register associated with the dimension/polarity pair is identified based on the offset.

At block 405, variable A is set to the pre-computed address stored in the identified register, and at block 406 the value stored in memory at address A is retrieved. Block 407 checks whether set R is empty; if not, the method continues back at block 403, otherwise the method terminates. As noted above, the method of FIG. 4 can be modified to apply to grids of other dimensions by modifying the definition of set D in block 401 accordingly.

Figure 5:
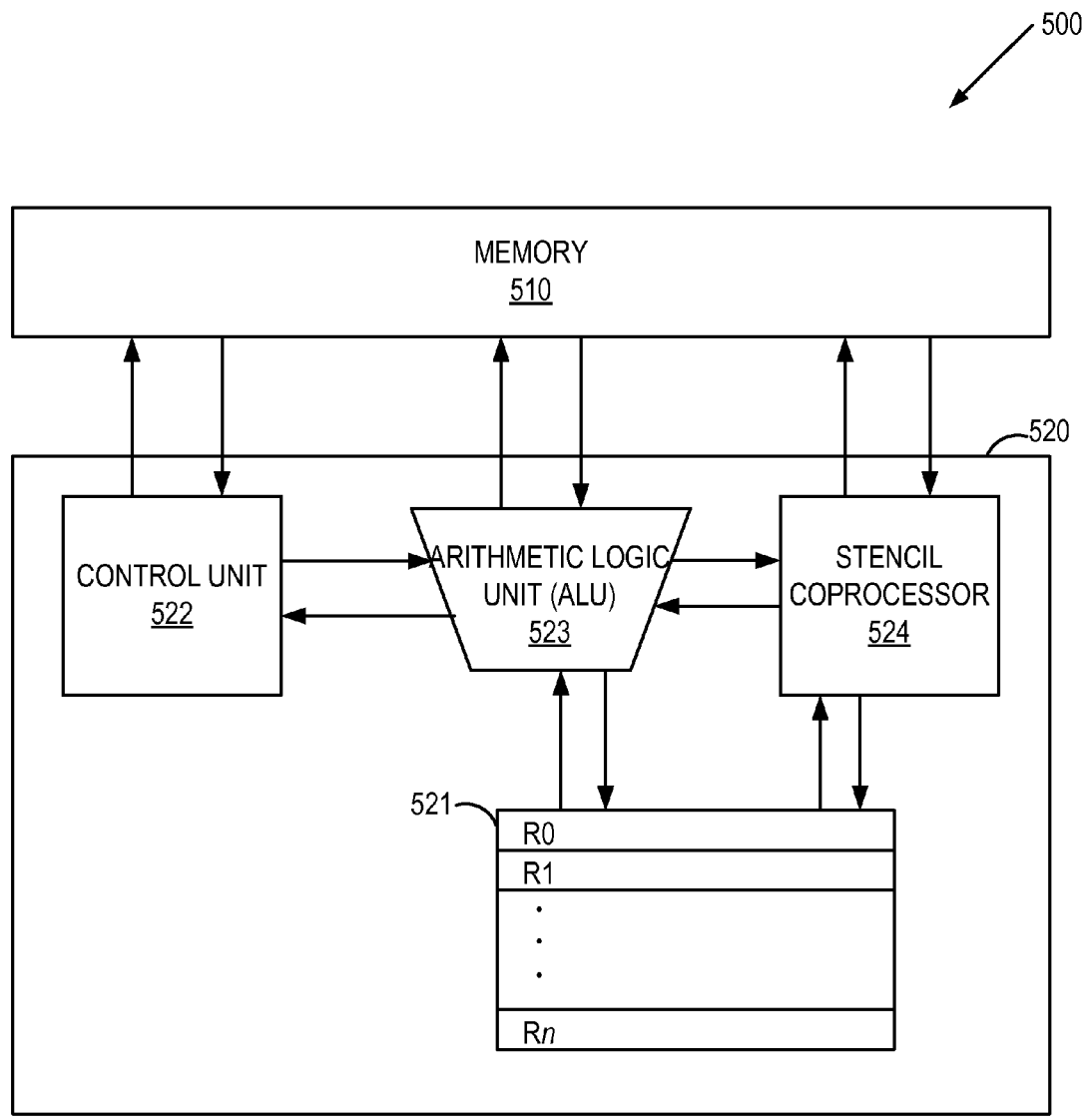
FIG. 5 depicts a block diagram of hardware that is capable of performing the methods of FIGS. 1 through 4, in accordance with one embodiment.

FIG. 5 depicts a block diagram of hardware 500 that is capable of efficiently performing the methods of FIGS. 1 through 4, in accordance with one embodiment of the present disclosure. As shown in FIG. 5, hardware 500 comprises a memory 510 and a processor 520, interconnected as shown. Memory 510 may include volatile memory devices (e.g., random access memory (RAM), etc.), non-volatile memory devices (e.g., flash memory), and/or other types of memory devices, and is capable of storing values of a multidimensional grid.

Processor 520 comprises registers 521, control unit 522, arithmetic logic unit (ALU) 523, and stencil coprocessor 524, interconnected as shown. Registers 521 are high-speed storage spaces that are local to processor 520 and referred to individually as R0 through Rn, where n is a positive integer. In one embodiment, registers 521 are configured to be directly accessible via a multiplexer.

Control unit 522 comprises hardware that extracts instructions from memory 510, decodes the instructions, and executes the instructions, sending signals to arithmetic logic unit (ALU) 523 as necessary to perform arithmetic and logic operations. In some embodiments, control unit 522 may be hardwired, while in some other embodiments, control unit 522 may be micro-programmed.

Arithmetic logic unit (ALU) 523 comprises hardware capable of performing mathematical and logical computations. In addition, as described below, ALU 523 is also capable of computing and transmitting offsets to stencil coprocessor 524, and of receiving from stencil coprocessor 524 values stored in memory 510 corresponding to nearby cells of a multidimensional grid.

Stencil coprocessor 524 comprises hardware that is capable of performing blocks 405, 405 and 406 of FIG. 4 rapidly via a single instruction that combines several processor instructions into one operand. In other words, stencil coprocessor 524 receives an offset associated with a particular dimension and polarity, identifies which register of registers 521 corresponds to the offset, loads the address stored in the identified register, and retrieves from memory 510 the value stored at that address, all in a single instruction. In one embodiment, ALU 523, upon receiving a signal from control unit 522 to perform an operation of a stencil computation, computes the appropriate offset and sends the offset to stencil coprocessor 524, and stencil coprocessor 524 returns the retrieved value (which corresponds to the value stored at a nearby cell) to ALU 523. In this way, stencil coprocessor 524 accelerates the stencil computations performed by processor 500 much like a floating point coprocessor or graphics coprocessor accelerates floating point arithmetic and graphics-related computations.

In one embodiment, memory 510 and processor 520 and reside on one or more printed circuit boards, such as, for example, a mother board, a daughter board or other type of circuit card. As will be appreciated by those skilled in the art, in some embodiments stencil coprocessor 524 and other elements of processor 520 may reside on a common carrier substrate, such as, for example, an integrated circuit ("IC") die substrate, a multi-chip module substrate, or the like, while in some other embodiments, stencil coprocessor 524 may be separate from other elements of processor 520 and external to processor 520. Similarly, in some embodiments memory 510 may reside on the same common carrier substrate as processor 520, while in some other embodiments, memory 510 may reside on a different substrate than processor 520.

In accordance with one embodiment, the methods of FIGS. 1 through 4 are performed by a computer system that comprises memory 510 and processor 520 and that may be a personal computer (PC), a set-top box (STB), a server, a network router, switch or bridge, or any machine capable of executing a set of instructions (sequential or otherwise) that specify actions to be taken by that machine. Further, the term "computer system" shall also be taken to include any collection of machines that individually or jointly execute a set (or multiple sets) of instructions to perform any one or more of the methodologies discussed herein.

The memory 510 may be a read-only memory (ROM), a flash memory, a dynamic random access memory (DRAM), a static random access memory (SRAM)), etc. The processor 520 may be one or more general-purpose processing devices such as a microprocessor, a central processing unit, or the like. More particularly, the processor 520 may be a complex instruction set computing (CISC) microprocessor, a reduced instruction set computing (RISC) microprocessor, a very long instruction word (VLIW) microprocessor, or a processor implementing other instruction sets or processors implementing a combination of instruction sets. The processor 520 may also be one or more special-purpose processing devices such as an application specific integrated circuit (ASIC), a field programmable gate array (FPGA), a digital signal processor (DSP), network processor, or the like. The processor 520 is configured to execute instructions for performing the operations and steps discussed herein. The instructions may reside, completely or at least partially, within the memory 510 and/or within the processor 520 during execution thereof by the computer system, the memory 510 and the processor 520 also constituting computer-readable media. It should be noted that in some other embodiments, the methods of FIGS. 1 through 4 may be performed instead by a computer system that utilizes a processor not specifically optimized for stencil computations (e.g., an Intel x86 microprocessor, an Advanced RISC Machines [ARM]-based processor, etc.) in lieu of processor 520.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "storing," "receiving," "retrieving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
    receiving, by a processor, an offset from a cell of a multidimensional grid, wherein the offset corresponds to an index of one of a plurality of registers of the processor; and
    retrieving by the processor, via a single instruction, a value from a memory address associated with the offset in response to the receiving of the offset, wherein the retrieving comprises:
        identifying, based on the offset, the one of the plurality of registers of the processor, wherein the identified register corresponds to a dimension and a polarity of the multidimensional grid;
        loading the memory address stored in the identified register; and
        retrieving the value from the memory address.

2. The method of claim 1 further comprising:
    determining, by the processor, a first address of the memory based on:
        a second address of the memory corresponding to the cell of the multidimensional grid,
        a first stride value for a first dimension of the multidimensional grid, and
        a first polarity; and
    storing, by the processor, the first address in a first register of the processor that is associated with the first dimension and with the first polarity.

3. The method of claim 2 further comprising:
    determining, by the processor, a third address of the memory based on:
        the second address,
        the first stride value, and
        a second polarity that is the opposite of the first polarity; and
    storing, by the processor, the third address in a second register of the processor that is associated with the first dimension and with the second polarity.

4. The method of claim 2 further comprising:
  determining, by the processor, a third address of the memory based on:
    the second address,
    a second stride value for a second dimension of the multidimensional grid, and
    a second polarity; and
  storing, by the processor, the third address in a second register of the processor that is associated with the second dimension and with the second polarity.

5. The method of claim 4 wherein the second polarity equals the first polarity.

6. The method of claim 4 wherein the second stride value is different than the first stride value.

7. The method of claim 2 wherein the first stride value is a positive integer greater than one.

8. The method of claim 2 further comprising:
  retrieving, by the processor, a value stored at the first address of the memory; and
  computing, by the processor, an updated value of the cell of the multidimensional grid based on the value retrieved from the first address of the memory.

9. The method of claim 8 wherein the computing is also based on a current value of the cell of the multidimensional grid.

10. A non-transitory computer readable storage medium including instructions that, when executed by a processor, cause the processor to perform operations comprising:
  predetermining, by the processor, a first address of a memory based on: a second address of the memory corresponding to a cell of a multidimensional grid, a first stride value for a first dimension of the multidimensional grid, and a first polarity;
  storing, by the processor, the first address in a first register of the processor that is associated with the first dimension and with the first polarity;
  predetermining, by the processor, a third address of the memory based on: the second address, a second stride value for a second dimension of the multidimensional grid, and a second polarity; and
  storing, by the processor, the third address in a second register of the processor that is associated with the second dimension and with the second polarity.

11. The non-transitory computer readable storage medium of claim 10, wherein the operations further comprise:
  receiving, by the processor, an offset; and
  retrieving by the processor, via a single instruction, a value from a memory in response to the receiving of the offset, wherein the retrieving comprises:
    identifying, based on the offset, one of a plurality of registers of the processor,
    loading an address stored in the identified register, and
    retrieving from the memory the value at the address.

12. The non-transitory computer readable storage medium of claim 10 wherein the first stride value is a positive integer greater than one.

13. The non-transitory computer readable storage medium of claim 10 wherein the second stride value is a positive integer greater than one and is different than the first stride value.

14. The non-transitory computer readable storage medium of claim 10 wherein the multidimensional grid is a two-dimensional grid.

15. The non-transitory computer readable storage medium of claim 10 wherein the multidimensional grid is a three-dimensional grid.

16. A system comprising:
  a plurality of registers to store data;
  an arithmetic logic unit (ALU); and
  a coprocessor to:
    receive from the ALU an offset from a cell of a multidimensional grid wherein the offset corresponds to an index of one of a plurality of registers of the coprocessor, and
    retrieve a value from a memory address associated with the offset via a single instruction, wherein to retrieve the value from memory via a single instruction the coprocessor is further to:
      identify, based on the offset, the one of the plurality of registers of the coprocessor, wherein the identified register is associated with a dimension and a polarity of the multidimensional grid;
      load the memory address stored in the identified register; and
      retrieve the value from the memory address.

17. The system of claim 16, wherein the coprocessor is further to:
  determine a first address of the memory based on:
    a second address of the memory corresponding to the cell of the multidimensional grid,
    a first stride value for a first dimension of the multidimensional grid, and
    a first polarity; and
  store the first address in a first register of the plurality of registers that is associated with the first dimension and with the first polarity.

18. The system of claim 17, wherein the coprocessor is further to:
  determine a third address of the memory based on:
    the second address,
    the first stride value, and
    a second polarity that is the opposite of the first polarity; and
  store the third address in a second register of the plurality of registers that is associated with the first dimension and with the second polarity.

19. The system of claim 17, wherein the coprocessor is further to:
  determine a third address of the memory based on:
    the second address,
    a second stride value for a second dimension of the multidimensional grid, and
    a second polarity; and
  store the third address in a second register of the plurality of registers that is associated with the second dimension and with the second polarity.

20. The system of claim 16 wherein the ALU is further to perform a stencil computation based on the value retrieved from the memory.

* * * * *